United States Patent
Tokoro (10) Patent No.: US 10,384,716 B2
(45) Date of Patent: Aug. 20, 2019

(54) ELECTRONIC STABILITY CONTROL APPARATUS

(71) Applicant: DENSO CORPORATION, Kariya, Aichi-pref. (JP)

(72) Inventor: Hirotaka Tokoro, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/683,575

(22) Filed: Aug. 22, 2017

(65) Prior Publication Data
US 2018/0057053 A1  Mar. 1, 2018

(30) Foreign Application Priority Data
Aug. 23, 2016  (JP) .................................. 2016-162802

(51) Int. Cl.
| | |
|---|---|
| *A01B 69/00* | (2006.01) |
| *B62D 15/02* | (2006.01) |
| *B60W 30/12* | (2006.01) |
| *B60W 10/20* | (2006.01) |
| *B60W 30/10* | (2006.01) |
| *B60W 50/00* | (2006.01) |

(52) U.S. Cl.
CPC ........... *B62D 15/025* (2013.01); *B60W 10/20* (2013.01); *B60W 30/10* (2013.01); *B60W 30/12* (2013.01); *B60W 2050/0008* (2013.01); *B60W 2520/14* (2013.01); *B60W 2550/146* (2013.01); *B60W 2720/14* (2013.01)

(58) Field of Classification Search
CPC .................................................... B62D 15/025
See application file for complete search history.

(56) References Cited

U.S. PATENT DOCUMENTS

2017/0122749 A1*  5/2017  Urano ..................... G01C 21/30
2017/0228159 A1*  8/2017  Tanaka .................. G06F 3/0659

FOREIGN PATENT DOCUMENTS

| JP | 2012-020652 A | 2/2012 |
|---|---|---|
| JP | 2013-212838 | 10/2013 |

* cited by examiner

*Primary Examiner* — Adam M Alharbi
(74) *Attorney, Agent, or Firm* — Knobbe, Martens, Olson & Bear, LLP

(57) ABSTRACT

An apparatus for performing driving aid control to cause a travel trajectory of a mobile object to follow a setpoint trajectory by transmitting a control command value to a yaw moment controller capable of controlling a yaw moment of the mobile object. In the apparatus, a first control command value calculator is configured to calculate a first control command value used to calculate the control command value. A straight-driving stabilizing compensator is configured to, when the mobile object is driving straight, calculate a first control command compensation value by decreasing the first control command value. A second control command value calculator is configured to calculate a second control command value used to calculate the control command value. A third control command value calculator is configured to calculate a final control command value based on the first control command compensation value and the second control command value.

6 Claims, 6 Drawing Sheets

FIG.7

ELECTRONIC STABILITY CONTROL APPARATUS

CROSS-REFERENCE TO RELATED APPLICATION

This application is based on and claims the benefit of priority from earlier Japanese Patent Application No. 2016-162802 filed Aug. 23, 2016, the description of which is incorporated herein by reference.

BACKGROUND

Technical Field

The present disclosure relates to a driving aid control apparatus.

Related Art

A driving aid apparatus disclosed in Japanese Patent Application Laid-Open Publication No. 2012-20652 includes a steering actuator and a steering control ECU. The steering actuator causes a steering device to generate an assistive torque to assist a driver's steering force. The steering control ECU is capable of performing feedforward control to control the assistive torque so that the vehicle can turn in accordance with a curvature of a lane in which the vehicle is traveling, and capable of performing feedback control to control the assistive torque so that the vehicle can approach a center line of a lane in which the vehicle is traveling. The steering control ECU determines whether or not the vehicle is changing lanes. If the vehicle is not changing lanes, the steering control ECU uses the assistive torque of the feedforward control. When the vehicle is changing lanes, the steering control ECU uses the assistive torque of the feedforward control and the assistive torque of the feedback control.

In a situation where the vehicle is traveling in a lane, a driver of the vehicle fine tunes a steering angle to keep straight-ahead driving or keep driving in a straight line. This may cause an oscillatory change in the travel direction of the vehicle. Such an oscillatory change in the travel direction of the vehicle may cause an oscillatory change in curvature information detected by the driving aid apparatus. The oscillatory change in the curvature information may in turn cause an oscillatory change in the assistive torque set by the feedforward control based on the curvature information. This can prevent stabilization of the vehicle behavior.

In view of the above, driving aid control apparatuses that can stabilize driving aid control are desired.

SUMMARY

The present disclosure provides an apparatus for performing driving aid control to cause a travel trajectory of a mobile object to follow a setpoint trajectory by transmitting a control command value to a yaw moment controller capable of controlling a yaw moment of the mobile object. The apparatus includes: a first control command value calculator configured to calculate a first control command value used to calculate the control command value; a straight-driving stabilizing compensator configured to, when the mobile object is driving straight, calculate a first control command compensation value by decreasing the first control command value, a second control command value calculator configured to calculate a second control command value used to calculate the control command value; and a third control command value calculator configured to calculate the final control command value based on the first control command compensation value and the second control command value.

With the above configuration, calculation of the first control command value by decreasing the first control command value can provide a first control command compensation value with oscillation suppressed as compared with the first control command value. Therefore, when the mobile object is driving straight, the final control command value is calculated based on the first control command compensation value with oscillation suppressed as compared with the first control command value. That is, the oscillation of the first control command value is less likely to affect the final control command value, which can improve stability of the driving aid control.

DESCRIPTION OF SPECIFIC EMBODIMENTS

Hereinafter, an exemplary embodiment of the present disclosure will be described in detail with reference to the accompanying drawings, in which like reference numerals refer to like or similar elements regardless of reference numerals and a duplicated description thereof will be omitted.

A driving aid control apparatus according to one embodiment will now be described with reference to the drawings. The driving aid control apparatus is used in a driving aid system that performs driving aid control to cause a travel trajectory of a vehicle to follow a setpoint trajectory.

Figure 1:
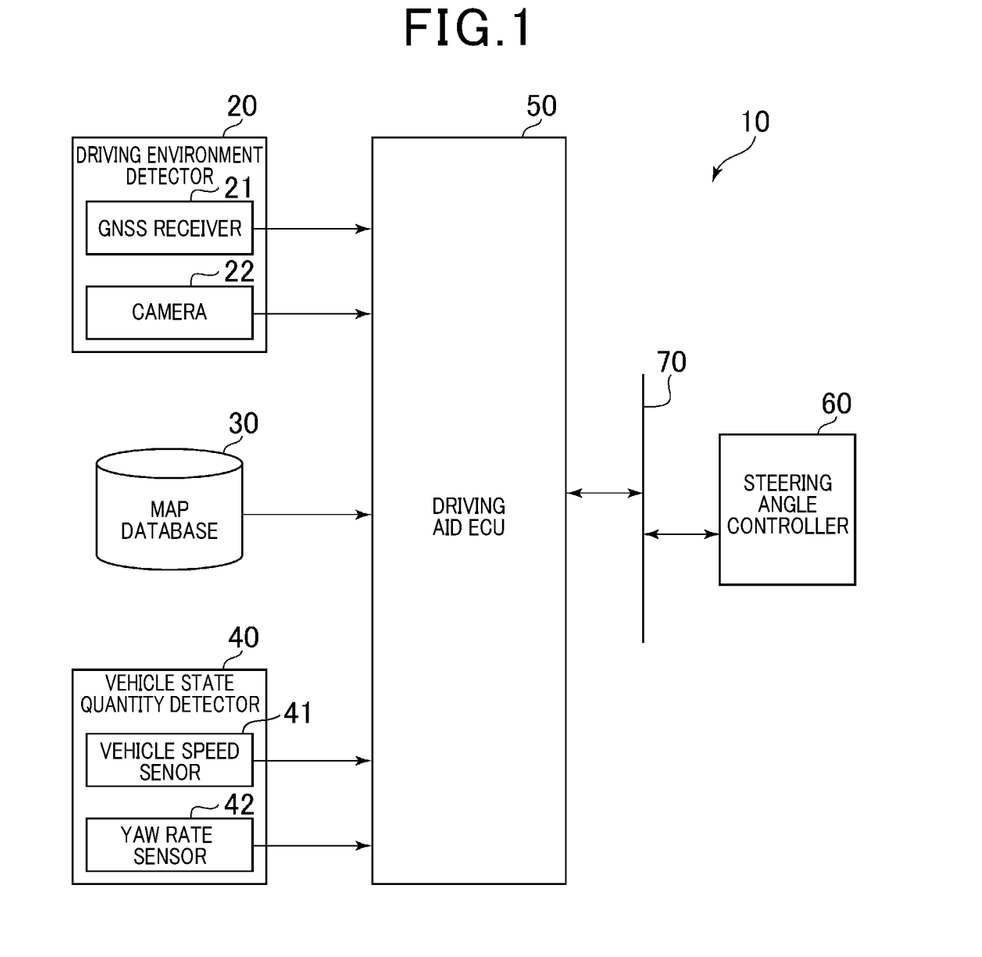
FIG. 1 illustrates a block diagram of a driving aid system according to one embodiment of the present disclosure.

As shown in FIG. 1, the driving aid system 10 for a vehicle according to the present embodiment includes a driving environment detector 20, a map database 30, a vehicle state quantity detector 40, a driving aid electronic control unit (ECU) 50, and a steering angle controller 60. In the present embodiment, the driving aid ECU 50 serves as a driving aid control apparatus.

The driving environment detector 20 detects a position of the vehicle, a road shape ahead of the vehicle, and others. The driving environment detector 20 includes a GNSS receiver 21 and a camera 22. The GNSS receiver 21 receives navigation signals from a plurality of satellites constituting a global navigation satellite system (GNSS), and outputs the received navigation signals to the driving aid ECU 50. The camera 22 outputs to the driving aid ECU 50 a signal corresponding to image data acquired by imaging ahead of the vehicle.

The map database 30 is a database of information, such as latitudes and longitudes of roads and various facilities. Information about road shapes and lanes of roads are also registered in the map database 30. The information about the lanes includes locations and types of the lane lines or lane boundaries. The map database 30 may be dedicated to the driving aid system 10 or may be a database commonly used in a car navigation device mounted in the vehicle.

The vehicle state quantity detector 40 detects various state quantities of the vehicle. The vehicle state quantity detector 40 includes a vehicle speed sensor 41 and a yaw rate sensor 42. The vehicle speed sensor 41 detects a travel speed of the vehicle based on a rotational speed of the wheel and outputs a signal corresponding to the detected travel speed to the driving aid ECU 50. The yaw rate sensor 42 detects a yaw rate that is a rate of change of a yaw angle over time and outputs a signal corresponding to the yaw rate to the driving aid ECU 50.

The driving aid ECU 50 is configured as a microcomputer or the like that incorporates therein a central processing unit (CPU) (not shown), a read-only memory (ROM) (not shown), a random access memory (RAM) (not shown). The CPU performs driving aid control processing to cause a travel trajectory of the vehicle to follow a setpoint trajectory. The ROM stores programs and data necessary for the driving aid control. The RAM transiently stores results of the CPU.

The driving aid ECU 50 loads output signals from the GNSS receiver 21 and the camera 22. The driving aid ECU 50 acquires information of a latitude $\varphi$ and longitude $\lambda$ corresponding to a current position of the vehicle based on the output signals from the GNSS receiver 21. The driving aid ECU 50 acquires image data I based on the output signal from the camera 22. The driving aid ECU 50 acquires map data M from the map database 30. The driving aid ECU 50 sets a setpoint trajectory La of the vehicle based on the acquired information from the GNSS receiver 21, the camera 22, and the map database 30.

The driving aid ECU 50 further loads output signals from the vehicle speed sensor 41 and the yaw rate sensor 42. The driving aid ECU 50 acquires information of a travel speed V and a yaw rate Y of the vehicle based on the output signals from the vehicle speed sensor 41 and the yaw rate sensor 42.

Based on the setpoint trajectory La, the travel speed V and the yaw rate Y, the driving aid ECU 50 calculates a steering angle command value $\delta$ for causing the actual travel trajectory of the vehicle to follow the setpoint trajectory La. The steering angle command value $\delta$ is a target steering angle.

The driving aid ECU 50 is communicatively connected to the steering angle controller 60 via an onboard network 70. The driving aid ECU 50 transmits via the onboard network 70 information of the steering angle command value $\delta$ to the steering angle controller 60, thereby performing the driving aid control to cause the travel trajectory of the vehicle to follow the setpoint trajectory.

The steering angle controller 60 is capable of controlling the steering angle of the vehicle. An electrically-powered steering device that applies an assistive torque to a steering shaft to thereby assist the driver of the vehicle in steering may be used as the steering angle controller 60. The steering angle controller 60 receives the steering angle command value $\delta$ from the driving aid ECU 50 via the onboard network 70, and performs steering angle feedback control to cause an actual steering angle to follow the steering angle command value $\delta$. In the present embodiment, the steering angle controller 60 serves as a yaw moment controller capable of controlling a yaw moment of the vehicle.

The driving aid control to be performed in the driving aid ECU 50 will now be described in more detail.

Figure 2:
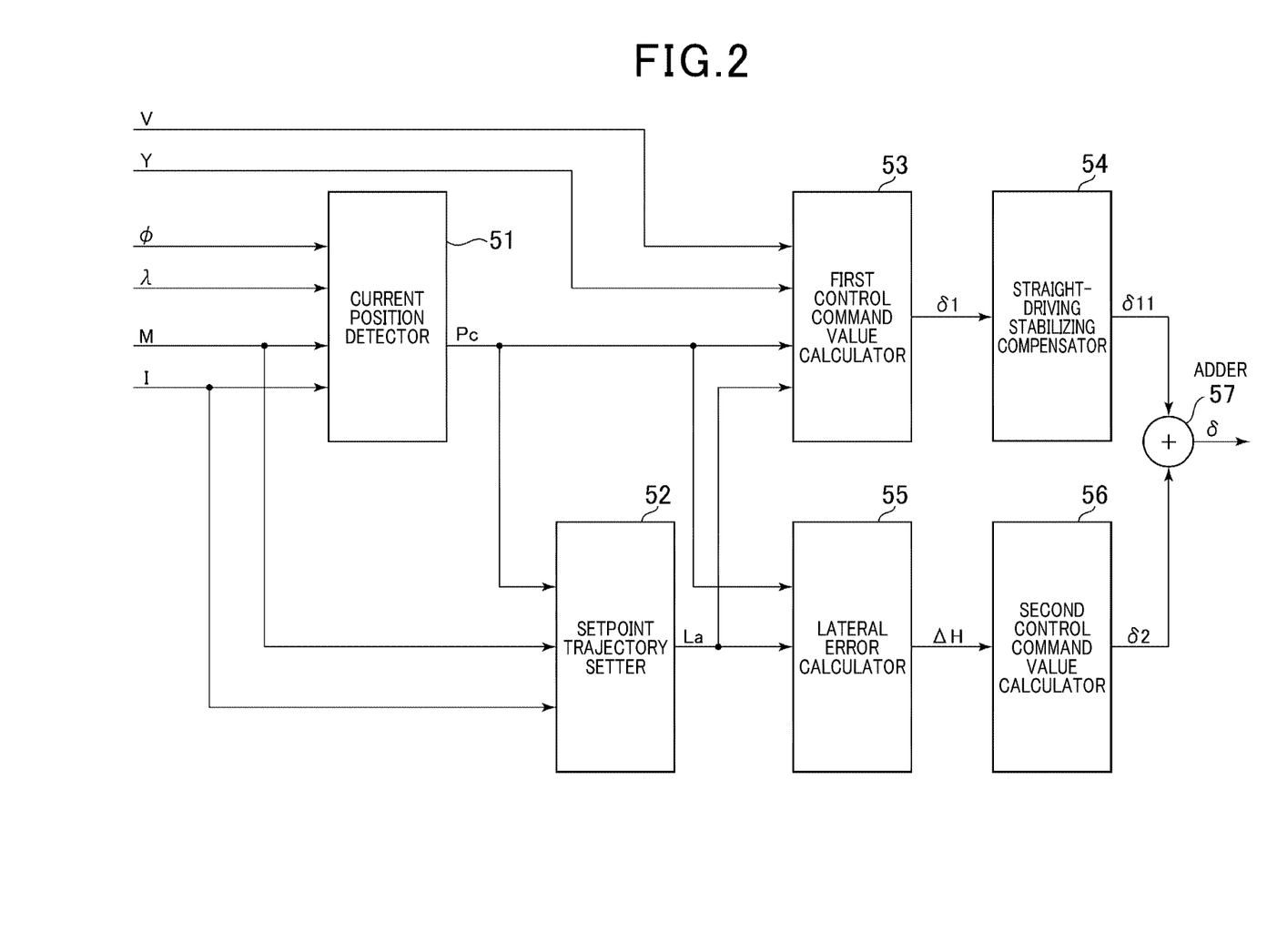
FIG. 2 illustrates a functional block diagram of a driving aid ECU of the embodiment.

As shown in FIG. 2, the driving aid ECU 50 includes a current position detector 51, a setpoint trajectory setter 52, a first control command value calculator 53, a straight-driving stabilizing compensator 54, a lateral error calculator 55, a second control command value calculator 56, and an adder 57.

The current position detector 51 receives information, such as a latitude $\varphi$ and longitude $\lambda$ corresponding to a current position of the vehicle, map data M, and image data I. The current position detector 51 detects a current position Pc of the vehicle based on the received information. More specifically, the latitude $\varphi$ and longitude $\lambda$ represent an absolute position on the map data M. The current position detector 51 translates the absolute position of the vehicle represented by the latitude $\varphi$ and longitude $\lambda$ on the map data M to a position in a vehicle's fixed coordinate system to acquire a relative positional relationship between each lane registered in the map data M and the vehicle. In addition, the current position detector 51 image-processes the image data in an appropriate manner to detect a position of a lane ahead of the vehicle, thereby acquiring a relative positional relationship between the lane and the vehicle. The current position detector 51 uses at least one of the relative positional relationship between the lane and the vehicle acquired from the map data M and the relative positional relationship between the lane and the vehicle acquired from the image data I to detect a current position Pc of the vehicle. Subsequent processing will be performed using the vehicle's fixed coordinate system.

The setpoint trajectory setter 52 receives information, such as the current position Pc of the vehicle detected by the current position detector 51, the map data M and the image data I. The setpoint trajectory setter 52 sets a setpoint trajectory La based on the received information. For example, the setpoint trajectory setter 52 detects positions of lane lines that demarcate the lane that the vehicle is traveling in based on the map data M and the image data I, and sets a setpoint trajectory La to a center line between the two-lane lines.

The first control command value calculator 53 receives information, such as the current position Pc of the vehicle detected by the current position detector 51, the setpoint trajectory La set by the setpoint trajectory setter 52, the travel speed V and yaw rate Y of the vehicle. Based on the received information, the first control command value calculator 53 calculates a first steering angle command value $\delta 1$ by performing feedforward control based on a future target position Pc* on the setpoint trajectory La. In the present embodiment, the first steering angle command value $\delta 1$ corresponds to a first control command value, and the feedforward control corresponds to target-position following control. The following control method may be used as the target-position following control.

Figure 3:
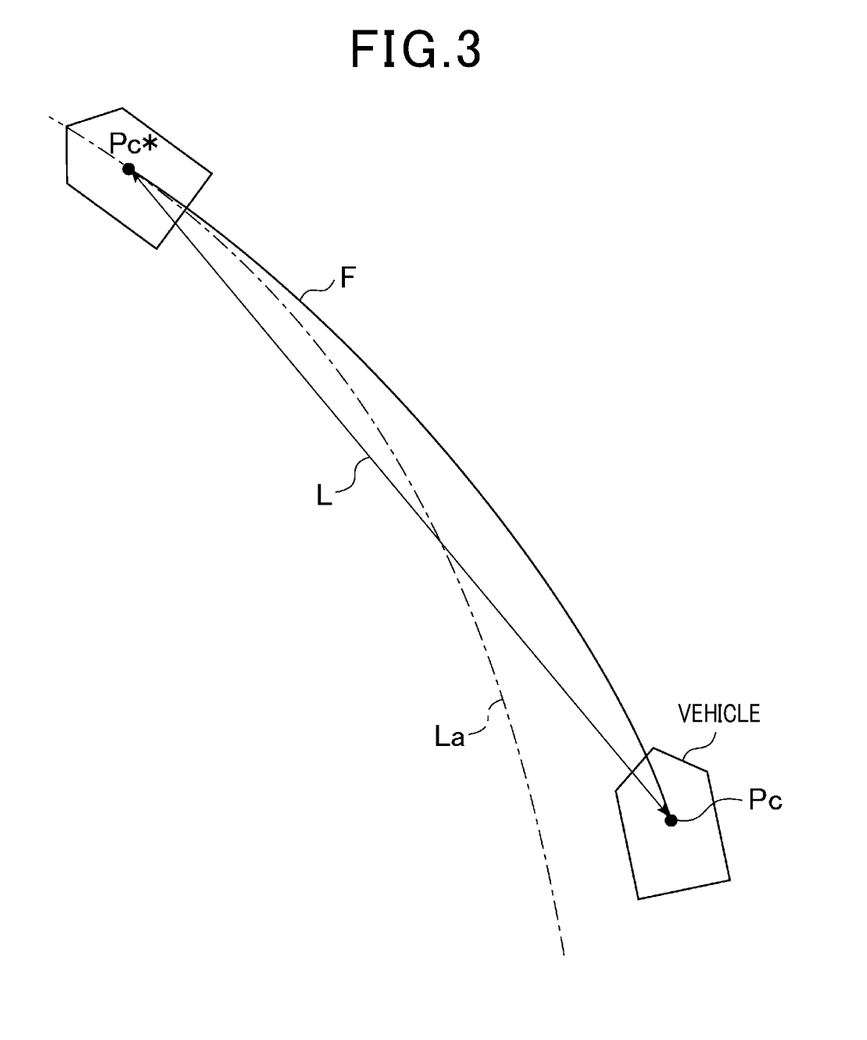
FIG. 3 illustrates target-position following control performed in the driving aid ECU of the embodiment.

As shown in FIG. 3, it is assumed that, when the vehicle is located at a position Pc during traveling around a curve, a setpoint trajectory La is set to a dashed-dotted curved line. The first control command value calculator 53 sets a future target position Pc* to a position that is on and along the setpoint trajectory La and spaced apart from the current position Pc of the vehicle by a predetermined distance L. The predetermined distance L may be a distance that the vehicle can travel at a travel speed V for a predetermined time period.

The first control command value calculator 53 calculates a travel trajectory F that allows the vehicle to approach the target position Pc* from the current position Pc and calculates a target curvature pa of the calculated travel trajectory F. Subsequently, the first control command value calculator 53 calculates a first steering angle command value δ1 to achieve the target curvature pa according to equations based on a two-wheel model of a vehicle.

More specifically, the first control command value calculator 53 calculates a first steering angle command value δ1 according to the following equations (f1)-(f3):

$$\delta 1 = V \times pa \times \frac{a11}{b11} \quad (\text{f1})$$

$$a11 = -2\frac{(Lf^2 \times Kf + Lr^2 \times Kr)}{J \times V} \quad (\text{f2})$$

$$b11 = 2\frac{Lf \times Kf}{J} \quad (\text{f3})$$

In the equations (f1)-(f3), J is a yaw moment of inertia of the vehicle, Kf is front-wheel cornering power, Kr is rear-wheel cornering power, Lf is a distance between a vehicle center of gravity and a front-wheel axis, and Lr is a distance between a vehicle center of gravity and a rear-wheel axis. These parameters are prestored in the ROM of the driving aid ECU 50.

As shown in FIG. 2, the straight-driving stabilizing compensator 54 receives the first steering angle command value δ1 calculated by the first control command value calculator 53. When the vehicle is driving straight, that is, when the vehicle is driving on a straight road, the straight-driving stabilizing compensator 54 decreases the first steering angle command value δ1 calculated by the first control command value calculator 53 to output the decreased first steering angle command value δ1 as a first steering angle command compensation value δ11. When the vehicle is not driving straight, the straight-driving stabilizing compensator 54 directly outputs the first steering angle command value δ1 as a first steering angle command compensation value δ11. In the present embodiment, the first steering angle command compensation value δ11 corresponds to a first control command compensation value.

More specifically, the straight-driving stabilizing compensator 54 calculates the gain Kdgn according to the following equation (f4):

$$Kdgn = \min\left(1, \left(\frac{\delta 1}{\delta th}\right)^2\right) \quad (\text{f4})$$

In the equation (f4), δth is a steering angle threshold. An amplitude of oscillatory change in the first steering angle command value δ1 that is unwanted when the vehicle is driving straight is measured in advance by experiments or the like, and the steering angle threshold δth is set to a value of the amplitude.

Figure 4:
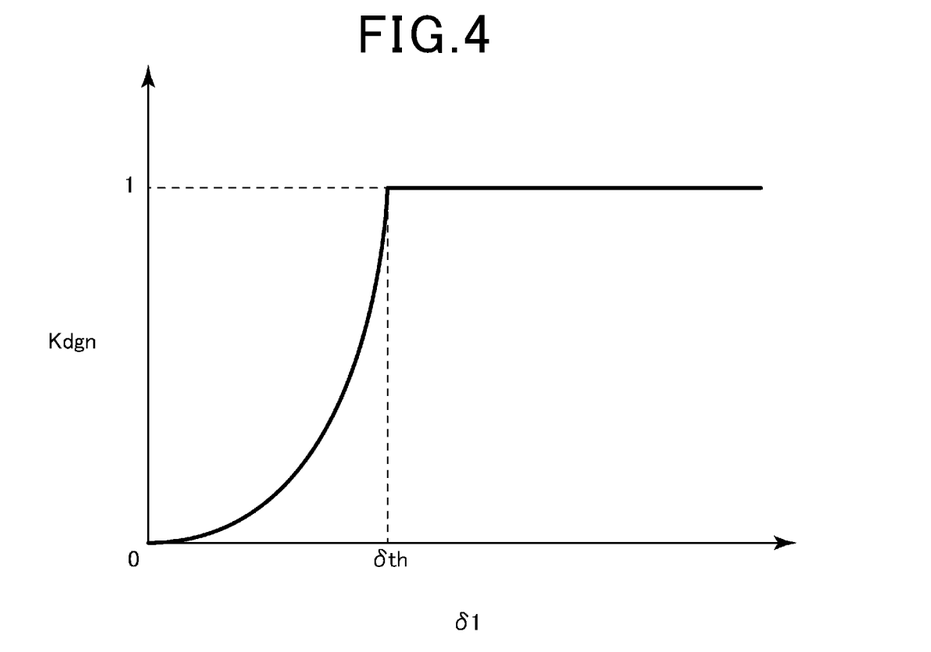
FIG. 4 is a graph illustrating a relationship between a first steering angle command value $\delta 1$ and a gain Kdgn.

According to the equation (f4), the straight-driving stabilizing compensator 54 sets the gain Kdgn to a smaller one of one and a square of (δ1/δth). That is, as shown in FIG. 4, if the first steering angle command value δ1 is less than the steering angle threshold δth, the gain Kdgn decreases quadratically as the first steering angle command value δ1 decreases, and if the first steering angle command value δ1 is equal to or greater than the steering angle threshold δth, the gain Kdgn is set to one.

Based on the gain Kdgn calculated according to the equation (f4) and the first steering angle command value δ1, the straight-driving stabilizing compensator 54 calculates a first steering angle command compensation value δ11 according to the following equation (f5):

$$\delta 11 = Kdgn \times \delta 1 \quad (\text{f5})$$

Figure 5:
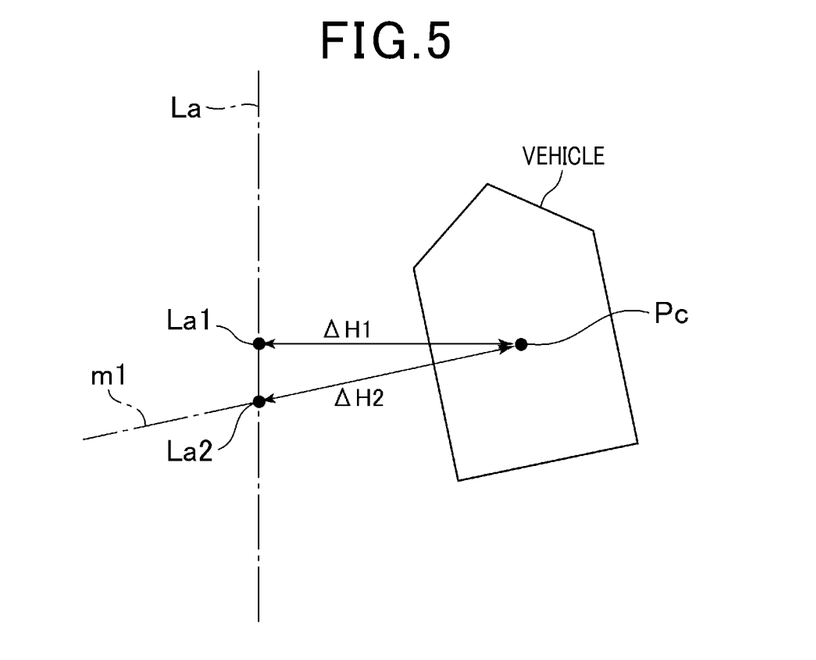
FIG. 5 illustrates an example of a lateral error used in setpoint-trajectory following control performed in the driving aid ECU of the embodiment.

As shown in FIG. 2, the lateral error calculator 55 receives information, such as the current position Pc of the vehicle detected by the current position detector 51 and the setpoint trajectory La set by the setpoint trajectory setter 52. Based on the received information, the lateral error calculator 55 calculates a lateral error ΔH that is an error between the current position Pc of the vehicle and the setpoint trajectory La. For example, as shown in FIG. 5, the lateral error calculator 55 may use a distance ΔH1 between the current position Pc and a position La1 on the setpoint trajectory La as a lateral error ΔH, where the position La1 is closest to the current position Pc. Alternatively, the lateral error calculator 55 may use a distance ΔH2 between the current position Pc of the vehicle and a position La2 as a lateral error ΔH, where the position La2 is an intersection of the setpoint trajectory La and an axis m1 laterally extending from the current position Pc of the vehicle.

As shown in FIG. 2, the second control command value calculator 56 receives information of the lateral error ΔH calculated by the lateral error calculator 55. The second control command value calculator 56 calculates a second steering angle command value δ2 based on the lateral error ΔH by performing setpoint-trajectory following control to cause the current position Pc to follow or approach the setpoint trajectory La. More specifically, the second control command value calculator 56 performs feedback control including integral control based on the lateral error ΔH, as the setpoint-trajectory following control. The second control command value calculator 56 calculates a second steering angle command value δ2 by multiplying an integrated value of the lateral error ΔH by an integral gain. In the present embodiment, the second steering angle command value δ2 corresponds to a second control command value.

The adder 57 adds the first steering angle command compensation value δ11 calculated by the straight-driving stabilizing compensator 54 and the second steering angle command value δ2 calculated by the second control command value calculator 56 to calculate a final steering angle command value δ. The driving aid ECU 50 transmits the steering angle command value δ calculated by the adder 57 to the steering angle controller 60. In the present embodiment, the adder 57 serves as a third control command value calculator.

Processing to calculate the steering angle command value δ to be performed in the driving aid ECU 50 will now be described with reference to FIG. 6.

Figure 6:
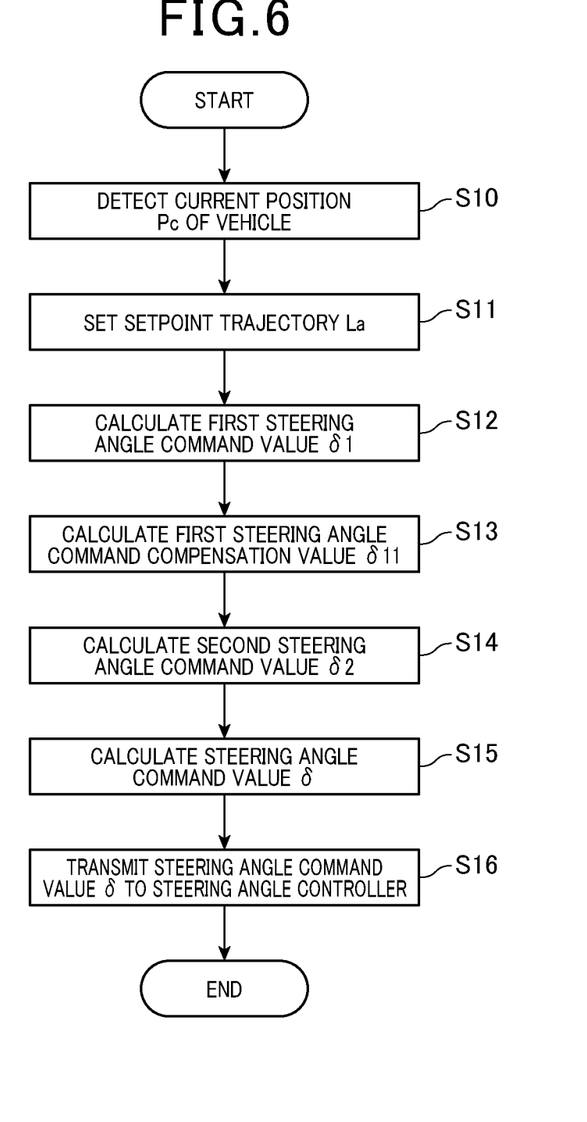
FIG. 6 is a flowchart of processing performed in the driving aid ECU of the embodiment.

As shown in FIG. 6, in step S10, the driving aid ECU 50 detects a current position Pc of the vehicle based on information, such as a latitude φ and longitude λ of the vehicle, map data M, and image data I. In step S11, the driving aid ECU 50 sets a setpoint trajectory La of the vehicle based on information, such as the current position Pc, the map data M, and the image data I. In step S12, the driving aid ECU 50 performs the target-position following control as the feedforward control to calculate a first steering angle command value δ1. More specifically, the driving aid ECU 50 calculates a first steering angle command value δ1 according to the equations (f1)-(f3) based on information, such as the current position Pc detected by the current position detector 51, the setpoint trajectory La set by the setpoint trajectory setter 52, the travel speed V and yaw rate Y. In step S13, the driving aid ECU 50 calculates a steering angle command compensation value $\delta 11$ based on the first steering angle command value $\delta 1$ according to the equations (f4) and (f5).

In step S14, the driving aid ECU 50 performs setpoint-trajectory following control as the feedback control to calculate a second steering angle command value $\delta 2$. More specifically, the driving aid ECU 50 calculates a lateral error $\Delta H$ based on information, such as the current position Pc detected by the current position detector 51 and the setpoint trajectory La set by the setpoint trajectory setter 52, and then performs the integral control based on the lateral error $\Delta H$ to thereby calculate a second steering angle command value $\delta 2$.

In step S15, the driving aid ECU 50 adds the first steering angle command compensation value $\delta 11$ and the second steering angle command value $\delta 2$ to calculate a final steering angle command value $\delta$. In step S16, the driving aid ECU 50 transmits the steering angle command value $\delta$ to the steering angle controller 60.

In the driving aid ECU 50, the current position detector 51 executes the operation of step 10. The setpoint trajectory setter 52 executes the operation of step 11. The first control command value calculator 53 executes the operation of step S12. The straight-driving stabilizing compensator 54 executes the operation of step S13. The second control command value calculator 55 executes the operation of step S14. The adder 57 executes the operation of step S15.

Figure 7:
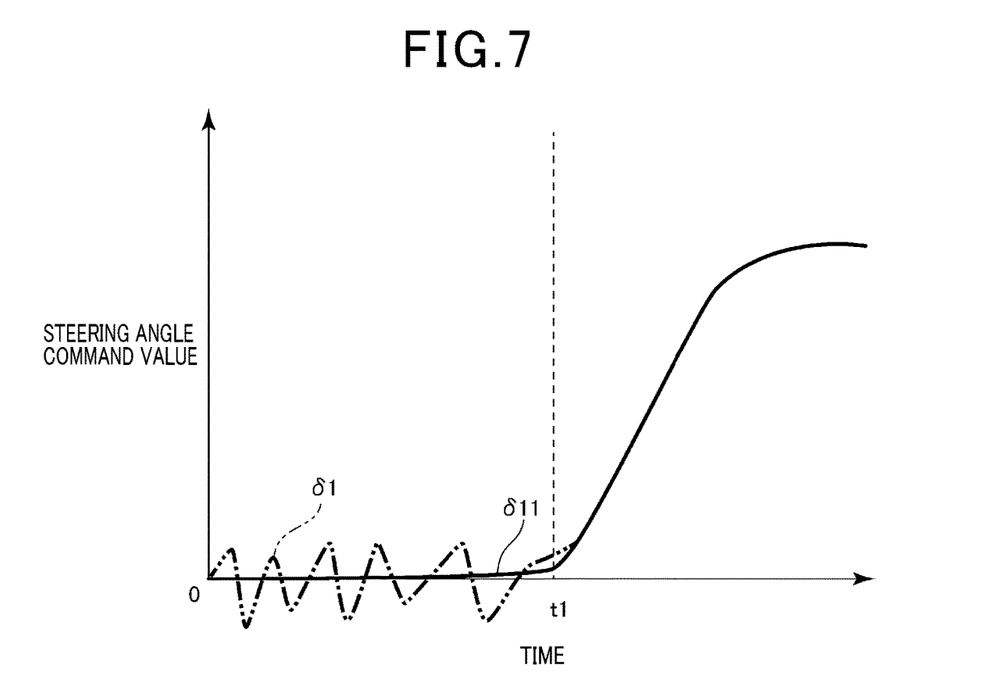
FIG. 7 is a graph illustrating a time course of each of a first steering angle command value $\delta 1$ and a first steering angle command compensation value $\delta 11$ in the driving aid ECU of the embodiment.

Operations of the driving aid system 10 will now be described with reference to FIG. 7. FIG. 7 illustrates a situation where the vehicle travels straight before time t1 and the vehicle turns left or right at or after time t1. In FIG. 7, the dashed-two dotted line represents a time course of the first steering angle command value $\delta 1$ and the solid line represents a time course of the first steering angle command compensation value $\delta 11$.

When the vehicle is driving straight, the driving aid ECU 50 adjusts finely the steering angle for the driver of the vehicle to keep the vehicle driving straight, which may cause disturbances. As indicated by the dashed-two dotted line in FIG. 7, the first steering angle command value $\delta 1$ is likely to oscillate until time t1 at which straight driving of the vehicle is terminated.

Even when the first steering angle command value $\delta 1$ oscillates during straight driving of the vehicle, the driving aid ECU 50 of the present embodiment, as shown in FIG. 4, sets the gain Kdgn to a value less than one if the oscillation amplitude of the first steering angle command value $\delta 1$ is less than the steering angle threshold $\delta$th. With this configuration, the first steering angle command compensation value $\delta 11$ is set to less than the first steering angle command value $\delta 1$. Thus, as indicated by the solid line in FIG. 7, the first steering angle command compensation value $\delta 11$ having the oscillation amplitude suppressed can be used. Accordingly, the oscillation of the first steering angle command value $\delta 1$ is less likely to affect the final steering angle command value $\delta$, which can improve stability of the driving aid control.

In addition, when the vehicle is turning, the first steering angle command value $\delta 1$ exceeds the steering angle threshold $\delta$th. As shown in FIG. 4, the gain Kdgn is then set to one. Thus, as indicated by the solid line in FIG. 7, the first steering angle command compensation value $\delta 11$ is directly set to the first steering angle command value $\delta 1$. With this configuration, the target-position following control based on the first steering angle command value $\delta 1$ can be reliably performed, thus ensuring the followability to the setpoint trajectory La.

The final steering angle command value $\delta$ is set to a sum of the first steering angle command value $\delta 1$ and the second steering angle command value $\delta 2$. Therefore, even if the first steering angle command compensation value $\delta 11$ is set to almost zero by the straight-driving stabilizing compensator 54, the setpoint-trajectory following control based on the second steering angle command value $\delta 2$ is performed. That is, in the presence of an error between the current position Pc of the vehicle and the setpoint trajectory La, the feedback control works to reduce such an error, which allows the position of the vehicle to follow the setpoint trajectory La. Therefore, deviation of the position of the vehicle from the setpoint trajectory La can be prevented.

The driving aid ECU 50 of the present embodiment described as above can provide the following advantages (1) to (5).

(1) When the vehicle is driving straight, the driving aid ECU 50 decreases the first steering angle command value $\delta 1$ to thereby calculate the first steering angle command compensation value $\delta 11$. The driving aid ECU 50 calculates the final steering angle command value $\delta$ based on the first steering angle command compensation value $\delta 11$ and the second steering angle command value $\delta 2$. With this configuration, even if an oscillatory change in the first steering angle command value $\delta 1$ occurs due to a disturbance, such an oscillatory change in the first steering angle command value $\delta 1$ is less likely to affect the final steering angle command value $\delta$, which can improve stability of the driving aid control.

(2) If the first steering angle command value $\delta 1$ is equal to or greater than the steering angle threshold $\delta$th, the straight-driving stabilizing straight-driving stabilizing compensator 54 directly outputs the first steering angle command value $\delta 1$ as the first steering angle command compensation value $\delta 11$. If the first steering angle command value $\delta 1$ is less than the steering angle threshold $\delta$th, the straight-driving stabilizing compensator 54 decreases the first steering angle command value $\delta 1$ to output it as the first steering angle command compensation value $\delta 11$. With this configuration, if the first steering angle command value $\delta 1$ is equal to or greater than the steering angle threshold $\delta$th, that is, when the vehicle is turning, the target-position following control based on the first steering angle command value $\delta 1$ is reliably performed, which can inhibit driving aid control responsiveness lowering during turning of the vehicle.

(3) The straight-driving stabilizing compensator 54 calculates the gain Kdgn based on a ratio of the first steering angle command value $\delta 1$ to the first steering angle threshold $\delta$th, and calculates the first steering angle command compensation value $\delta 11$ by multiplying the first steering angle command value $\delta 1$ by the gain Kdgn. With this configuration, the first steering angle command compensation value $\delta 11$ can be decreased significantly after the vehicle has entered a straight road from a curve. This is because the gain Kdgn decreases as the first steering angle command value $\delta 1$ decreases due to the vehicle having passed the curve and entered the straight road. Therefore, the first steering angle command value $\delta 1$ can be decreased during straight driving of the vehicle without determining whether or not the vehicle is driving straight.

(4) The straight-driving stabilizing compensator 54 sets the gain Kdgn to a smaller one of one and a square of the ratio of the first steering angle command value $\delta 1$ to the steering angle threshold $\delta$th. With this configuration, when the gain Kdgn is set to a square of the ratio of the first steering angle command value $\delta 1$ to the steering angle threshold δth, the first steering angle command compensation value δ11 decreases with decreasing ratio of the first steering angle command value δ1 to the steering angle threshold δth. This can more reliably inhibit oscillation of the first steering angle command compensation value δ11, which can further improve the driving aid control stability.

(5) The first control command value calculator 53 calculates a first steering angle command value δ1 by performing feedforward control based on a future target position Pc* on a setpoint trajectory La. The second control command value calculator 56 calculates a second steering angle command value δ2 by performing feedback control based on a lateral error ΔH that is an error between a current position Pc of the vehicle and the setpoint trajectory La. In such a driving aid ECU 50 configured to perform the feedforward control and the feedback control in combination, oscillation of the feedforward control that may occur during straight driving of the vehicle is likely to adversely affect the vehicle behavior. Therefore, the above configuration is advantageous to inhibit the oscillation.

Modifications

There will now be described some modifications that may be devised without departing from the spirit and scope of the present disclosure.

(M1) Methods used by the current position detector 51 to detect the current position Pc of the vehicle may be changed as appropriate. For example, the current position detector 51 may detect the current position Pc of the vehicle based on lane lines detected by the laser radar device or the millimeter-wave radar. The current position detector 51 may estimate a current position Pc of the vehicle based on dead reckoning based on a travel speed V detected by the travel speed sensor 41 and a yaw rate Y detected by the yaw rate sensor 42. The current position detector 51 may estimate a current position Pc of the vehicle based on a combination of various vehicle state quantities, such as the image data I, a travel speed V, a yaw rate Y, an acceleration, a steering angle, and a slip angle.

(M2) The method of the target-position following control performed by the first control command value calculator 53 may be changed as appropriate. For example, the first control command value calculator 53 may calculate the first steering angle command value δ1 using a look-ahead model, a primary predictive model, a secondary predictive model or the like. The look-ahead model is a control method based on a lateral error between the setpoint trajectory La and a point of regard that is located at a predetermined distance from the current position Pc in the travel direction of the vehicle. The primary predictive model and the secondary predictive model are control methods based on a future lateral error that is an error between the setpoint trajectory La and a predictive position of the vehicle after a predetermined period of time has elapsed and is calculated based on predefined vehicle state quantities. In the primary predictive model, a linear expression with the vehicle state quantities as variables is used, where the linear expression represents a relationship between a predicted position of the vehicle and the vehicle state quantities. In the secondary predictive model, a quadratic expression with the vehicle state quantities as variables is used, where the quadratic expression represents a relationship between a predicted position of the vehicle and the vehicle state quantities.

(M3) The straight-driving stabilizing compensator 54 may be configured to determine whether or not the vehicle is driving straight based on vehicle state quantities, such as a steering angle and yaw rate Y of the vehicle, and if it is determined that the vehicle is driving straight, decrease the first steering angle command value δ1. That is, the straight-driving stabilizing compensator 54 may include a determiner configured to determine whether or not the vehicle is driving straight.

(M4) The straight-driving stabilizing compensator 54 may use a value of an nth order function, logarithm function, or exponential function of the ratio of the first steering angle command value δ1 to the steering angle threshold δth, as the gain Kdgn.

(M5) The straight-driving stabilizing compensator 54 may decrease the second steering angle command value δ2 instead of the first steering angle command value δ1.

(M6) Methods used by the driving aid ECU 50 to detect the travel speed V and the yaw rate Y may be changed as appropriate. For example, the driving aid ECU 50 may detect the travel speed V using a GNSS speedometer. Alternatively, the driving aid ECU 50 may detect the travel speed V based on an absolute speed acquired from the image data I of the camera 22. The driving aid ECU 50 may detect the yaw rate Y based on a speed difference between the left and right wheels.

(M7) Methods used by the setpoint trajectory setter 52 to set the setpoint trajectory La may be changed as appropriate. For example, to support a lane change, the setpoint trajectory setter 52 may set the setpoint trajectory La to cross a lane line between different lanes. The setpoint trajectory setter 52 may detect an obstacle to travel of the vehicle based on the current position Pc, the map data M, and the image data I, and may set the setpoint trajectory La that can avoid the obstacle. The setpoint trajectory setter 52 may calculate a plurality of setpoint trajectory La candidates and then select one of the plurality of setpoint trajectory La candidates as a setpoint trajectory La to be traveled.

(M8) In the embodiment described above, the map database 30 used in the driving aid system 10 is a database mounted in a vehicle. Alternatively, the map database 30 may be a map database that is registered in and downloaded from a server.

(M9) The steering angle controller 60 is a device to correct the travel trajectory of the vehicle by generating a yaw moment applied to the vehicle. Such a device is not limited to the steering angle controller 60. Instead of using the steering angle controller 60, a device may be used that is configured to change the distribution of driving or braking forces to the wheels of the vehicle to thereby generate a yaw moment applied to the vehicle.

(M10) Alternatively, the driving aid ECU 50 may calculate an arbitrary control command value that allows a steering angle of the vehicle to be controlled. Such a control command value may include a control command value of assistive torque to be applied from a motor to a steering shaft. In addition, types of the first and second control command values respectively calculated by the first control command value calculator 53 and the second control command value calculator 55 may be changed depending on a type of control command value calculated by the driving aid ECU 50.

(M11) In the embodiment described above, the driving aid ECU 50 is applied to every automobile. Alternatively, the driving aid ECU 50 configured as above may be applied to any other type of vehicle, such as a motorcycle or a bicycle.

(M12) The means and/or functions provided by the driving aid ECU 50 can be provided by software stored in a non-transitory computer-readable storage medium and a computer executing it, software only, hardware only, or a combination thereof. For example, when the driving aid ECU 50 is provided by an electronic circuit which is hardware, it can be provided by a digital circuit including a number of logic circuits or an analog circuit.

(M13) The embodiments of the present disclosure have been described with reference to specific examples. However, the disclosure is not limited to those specific examples. Any design modification applied to such specific examples by a person skilled in the art is encompassed in the scope of the present disclosure, as long as it has the features of the present disclosure. Each element included in each of the above-mentioned specific examples, as well as the arrangement, are not limited to those illustrated in the specific examples and may be arbitrarily changed.

What is claimed is:

1. An apparatus for performing driving aid control to cause a travel trajectory of a mobile object to follow a setpoint trajectory by transmitting a control command value to a yaw moment controller capable of controlling a yaw moment of the mobile object, the apparatus comprising:

a first control command value calculator configured to calculate a first control command value used to calculate the control command value;

a straight-driving stabilizing compensator configured to, in response to the mobile object driving straight, calculate a first control command compensation value by decreasing the first control command value;

a second control command value calculator configured to calculate a second control command value used to calculate the control command value; and a third control command value calculator configured to calculate a final control command value based on the first control command compensation value and the second control command value.

2. The apparatus according to claim 1, wherein the straight-driving stabilizing compensator is configured to, based on the first control command value being equal to or greater than a predetermined control threshold, directly output the first control command value as the first control command compensation value, and based on the first control command value being less than the predetermined control threshold, decrease the first control command value to output the decreased first control command value as the first control command compensation value.

3. The apparatus according to claim 2, wherein the straight-driving stabilizing compensator is configured to calculate a gain based on a ratio of the first control command value to the predetermined control threshold, and calculate the first control command compensation value by multiplying the first control command value by the gain.

4. The apparatus according to claim 3, wherein the straight-driving stabilizing compensator is configured to calculate a smaller one of a predetermined value and a square of the ratio of the first control command value to the predetermined control threshold, as the gain.

5. The apparatus according to claim 1, wherein the control command value is a steering angle control command value.

6. The apparatus according to claim 1, wherein the first control command value calculator is configured to calculate the first control command value by performing feedforward control based on a future target position of the mobile object on the setpoint trajectory, and the second control command value calculator is configured to calculate the second control command value by performing feedback control based on a lateral error that is an error between a current position of the mobile object and the setpoint trajectory.

* * * * *